United States Patent [19]

Robache

[11] Patent Number: 5,014,500

[45] Date of Patent: May 14, 1991

[54] DEVICE AND INSTALLATION FOR FORMING AND CLOSING TRAYS

[75] Inventor: Patrick Robache, Paris, France

[73] Assignee: Mecaplastic, Bagnolet, France

[21] Appl. No.: 538,701

[22] Filed: Jun. 15, 1990

[30] Foreign Application Priority Data

Jun. 16, 1989 [FR] France ............... 89 08005

[51] Int. Cl.$^5$ .............. B65B 47/04; B65B 47/02; B65B 51/14
[52] U.S. Cl. ............................. 53/559; 53/370.7; 425/384; 425/398
[58] Field of Search ............... 53/453, 559, 454, 456, 53/560, 561, 373; 425/384, 398

[56] References Cited

U.S. PATENT DOCUMENTS

| | | | |
|---|---|---|---|
| 3,399,763 | 9/1968 | Stone | 53/453 X |
| 3,577,700 | 5/1971 | Bippus et al. | 53/559 X |
| 3,964,237 | 6/1976 | Johansen | 53/559 X |
| 4,048,781 | 9/1977 | Johansen | 53/453 |
| 4,565,052 | 1/1986 | Hautemont | 53/559 X |

FOREIGN PATENT DOCUMENTS 2722745 11/1978 Fed. Rep. of Germany .
2210579 6/1989 United Kingdom .

Primary Examiner—Horace M. Culver
Attorney, Agent, or Firm—Young & Thompson

[57] ABSTRACT

A device for producing plastic trays (1) in which two parallel opposed walls (6, 7) are slanted in respect to a plane perpendicular to the sealing plane thereof. The two molding or thermoforming tools (12, 13) in this device are respectively carried by two movable supports (14, 15) capable of moving the tools along an axis (Z—Z') parallel to slanted walls of the tools which correspond to the slanted walls (6, 7) of the tray (1) to be produced. This slanted axis (Z—Z') makes it possible to use simple molding tools, namely an external female tool (12) and an internal punch (14). The packaging plant comprises a tray-forming device (8) as above-described, followed by a welding station (17) for welding a sealing film (18) onto the salient peripheral rim (3) of each plastic tray (1). In this station (17), a movable support member (22) for the tray (1) is movable along an axis (W—W') having the same slant as the sidewalls (6, 7) of the tray. The welding station (17) is followed by a cut-off station (23) for separating the trays having been formed as a continuous strip. The cutting tool (24) in this station (23) moves along an axis (V—V') which also has the same slant as the sidewalls (6, 7) of the tray. The trays (1) can be placed upright on a display shelf (2), so that advertising features appearing on the sealing film (4) are readily visible to potential buyers.

3 Claims, 2 Drawing Sheets

DEVICE AND INSTALLATION FOR FORMING AND CLOSING TRAYS

BACKGROUND

This invention relates to packagings used for the conditioning of various products, particularly food products, these packagings consisting in a tray made of thermoplastic material, this tray being tightly sealed with a welded-on sealing film after having been filled.

Packagings of this kind have the advantage of affording an excellent preservation of the packaged goods. Also, these packagings are easy to use, since it will be sufficient to remove the sealing film for releasing the contents.

However, these packagings have this drawback that they are designed for being laid flat, so that advertising mentions placed on the sealing film are not visible to potential buyers when such packagings are placed on display shelves or the like.

For eliminating this drawback, it has been suggested to provide the trays with a particular shape allowing them to remain stable in an upright position. For this purpose, two of the opposed walls of these trays are inclined in respect of a plane being perpendicular to the plane of the welded-on sealing film, instead of laying parallel to such a plane. This will then allow these trays to be placed in an upright position in which they can rest on a horizontal support, on the first part, along one side of their salient peripheral top rim, and, on the other part, along the lower side of the inclined wall which projects outwardly.

However, the manufacturing of such trays requires the use of special moulds which are relatively costly, for allowing the release of the male part of the mould being used. Moreover, the particular shape of these trays gives rise to further difficulties in the conditioning plants designed for producing such trays as well as for sealing them with a welded-on sealing film.

Therefore, it is an object of the present invention to provide a manufacturing device operating by moulding or thermoforming which is specially intended for the production of trays having slanted walls, this device being designed so as to avoid the drawbacks of earlier devices now being used for this production.

BRIEF DESCRIPTION OF THE INVENTION

In order to meet the above-stated purpose, the device according to the present invention is characterized in that the two moulding parts or forming parts provided in this device are carried on movable supports adapted for guiding their displacement along an axis parallel to the inclined walls of these parts which correspond to the inclined walls of the packaging tray which is to be produced, this displacement axis being therefore inclined to the same extent in respect of a plane being perpendicular to the closing plane of this moulding or forming device. This arrangement has the advantage of making it possible to use simple moulding parts constituted by an external female part and an internal punch.

The present invention also has for its object an installation which is specially designed for conditioning products of any kind, more particularly food products, in plastic trays having inclined walls, so that they may subsequently be placed and maintained in an upright position. This installation is characterized in that it comprises:

for the continuous production of the trays, a thermoforming device as defined hereinabove;

downstream of the thermoforming device, a welding station for welding a sealing film onto the rim of each tray, the hollow support member provided in the welding station for receiving the respective tray having slanted walls matching the slanted walls of a tray, said support member being movable along an axis having the same slant as the inclined walls of the tray.

Further features and advantages of the present invention will be apparent from the following description, with reference to the appended drawings, in which.

DETAILED DESCRIPTION

Figure 1:
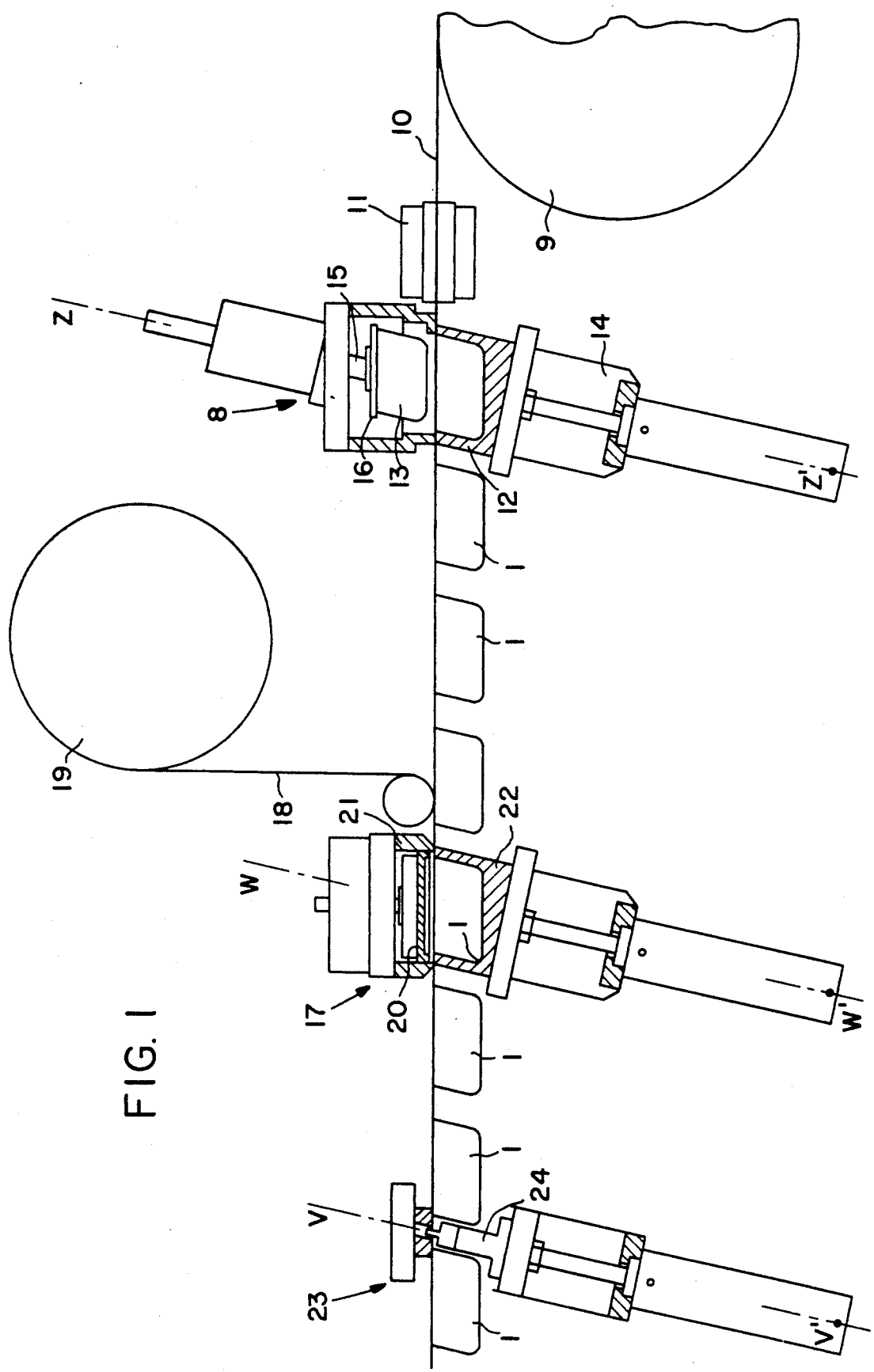
FIG. 1 is a diagrammatical view, in longitudinal cross-section, of an installation for conditioning a product of any kind in trays having slanted walls.
Figure 2:
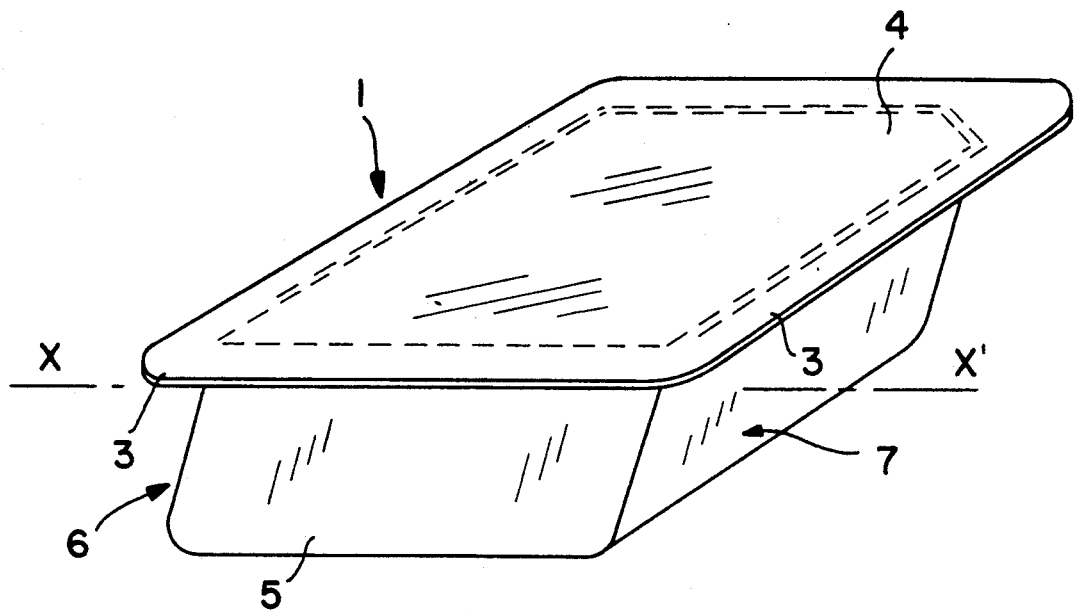
FIG. 2 is a perspective view of a packaging produced by means of the installation of FIG. 1.

Referring to FIG. 1, the installation shown in this FIG. is intended for packaging products of any kind in trays 1 which are adapted for being placed in an upstanding position on a horizontal support such as a display shelf 2. In a manner similar to all other usual conditioning trays, the trays 1 are provided with a peripheral salient rim 3 which defines the plane X—X' along which the tray will be sealed. The sealing film 4 of the tray 1 is placed in this plane X—X' and is welded onto the upper face of the tray rim 3. The two end walls 5 of the tray present the usual shape, so that they are parallel to a plane which is perpendicular to the sealing plane X—X', or else they are inclined towards each other towards the bottom of the tray.

Figure 3:
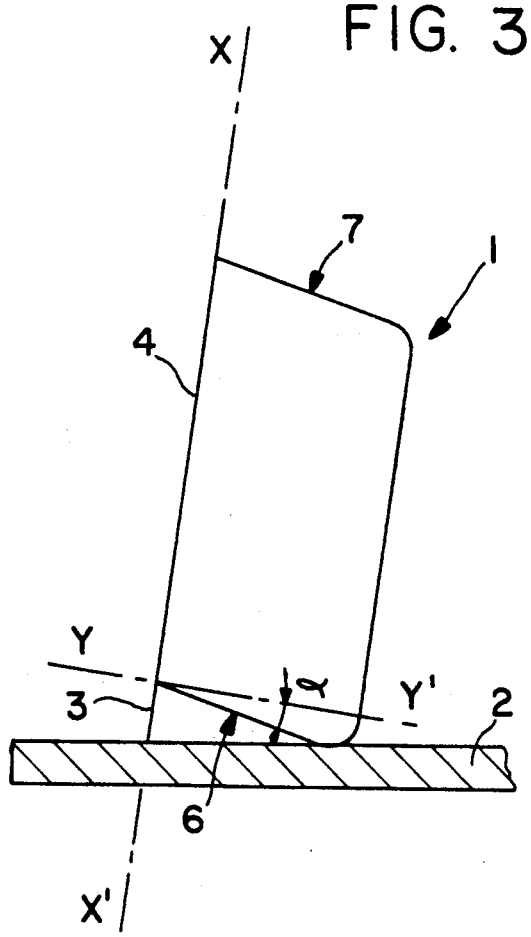
FIG. 3 is an elevation view of a packaging according to FIG. 2, showing the tray in upstanding position on a horizontal support such as a display shelf.

On the other hand, the two longer opposed sidewalls 6 and 7 have a particular shape which allows for a tray to be placed in the upstanding position shown in FIG. 3. For this purpose, these two parallel walls are inclined by an angle $\alpha$ in respect of a plane Y—Y' which is perpendicular to the plane of Sealing X—X'. The magnitude of this angle $\alpha$ must be determined so that, after the tray will have been filled with goods, the corresponding package will be able to remain stable when standing in the upright position shown in FIG. 3. For determining this angle $\alpha$, account is to be taken, more particularly, of the width of the outwardly salient portion of the rim 3, as well as of the depth of the tray 1. By way of example only, it can be stated that the angle $\alpha$ may have a value comprised between 5° and 30°.

The installation shown in FIG. 1 comprises a thermoforming station 8 which constitutes, in this installation, the device for manufacturing the trays 1. This station 8 is supplied from a reel 9 carrying the film 10 used for producing the trays 1. Before reaching the thermoforming station 8, this film passes through a preheating station 11.

The thermoforming station 8 comprises two shaping parts constituted respectively by an external female part 12 having the shape of a bowl and a male part 13 which is shaped as a punch. These two parts are fixed to movable supports, respectively 14 and 15. These supports have a particular feature, namely that they are movable along an axis 22 which is inclined by an angle $\alpha$ in respect of the plane along which moves the film 10, this plane corresponding to the sealing plane of the trays which will be produced. Obviously, the sidewalls of the two moulding parts 12 and 13 present the same slant, so as to form between them the slanting walls 6 and 7 of the trays 1. On the contrary, the upper rim 16 of the male forming part 13 is parallel to the plane of the film 10, so as to form the peripheral rim 3 of the tray along this same plane.

Due to the fact that they move along a slanted axis Z—Z', the two moulding parts 12 and 13 may have a very simple design. In the present case, these parts are made of a single piece, which does not include a slide which would be required if the stroke axis were parallel to the plane of the film 10. As a result, there is achieved an increase of production rates as well as a reduction in the cost of construction of the installation.

The thermoforming station 8 is followed by a sealing station 17 in which the sealing film 18 supplied from a reel 19 is welded onto the rim 3 of the tray. In the usual manner, this welding station 17 comprises a movable upper welding electrode 20 which is placed inside a bell-shaped housing 21 which forms an air-tight enclosure for the welding electrode. The lower portion of the welding station comprises a hollow support member 22 having the shape of a bowl, which is intended for supporting a packaging tray 1 during the welding operation.

This movable support member 22 has this specific feature of being movable along an axis W—W' having the same slant as the sidewalls 6 and 7 of the trays 1. Here again, this feature makes it possible to use a support member of a very simple design.

Finally, the installation comprises a cut-off station 23 for separating the trays having been formed in a continuous succession. The cutting tool 24 provided in this station 23 is mounted so as to be movable along an axis V—V' which also has the same slant as the sidewalls 6 and 7 of the trays 1. This allows therefore an easy insertion of the cutting tool 24 between two consecutive trays, as shown in FIG. 1.

It will be appropriate to note that the thermoforming device 8 for manufacturing the trays could be replaced with a moulding device which would then be adapted for producing the trays 1 separately, one after the other, from injected plastic material. In this case, this moulding device would present the same main feature as the thermoforming device 8. Accordingly, the two moulding parts would then be mounted on movable supports adapted for moving along an axis having the same slant as the sidewalls 6 and 7 of the trays which are to be produced.

Obviously, this moulding device could be integrated in a complete conditioning plant capable of carrying out the welding operation for sealing the tray with a sealing film 18. In this case, the welding station would be identical with the welding station 17 provided in the example illustrated in FIG. 1. Similarly, the final cut-off station would be similar to the cut-off station 23 also provided in the above-said example.

As already stated herein, the packagings manufactured in this manner have the advantage of being capable of being placed in a stable manner in the upright position shown in FIG. 3. Under these conditions, the advertising material appearing on the sealing film 4 of these packagings will be perfectly visible by potential buyers when these packagings are placed on a display shelf in a retail store.

What is claimed is:

1. A device for forming a packaging tray having two opposite parallel walls slanted in respect of a plane perpendicular to a sealing plane of said tray, in which two forming parts are carried on movable supports adapted for moving said parts along an axis parallel to slanted walls of said parts which form the slanted walls of the packaging tray which is to be produced, this displacement axis being also parallel to said slanted walls of said tray, said forming parts comprising an external female part and an internal punch.

2. A device as claimed in claim 1, in combination with a welding station adapted to receive formed trays and to weld a sealing film onto said sealing plane of each tray, this welding station comprising a hollow support member provided for receiving a said tray, said support member having slanted walls corresponding to the slanted walls of each tray and being mounted so as to be movable along an axis having the same slant as said slanted walls.

3. A device as claimed in claim 2, in which there is provided, on the side of the welding station opposite the forming device, a cut-off station for separating packages produced in said welding station, a cutting tool in this cut-off station being movable along an axis which is parallel with the slanted walls of the conditioning trays.

* * * * *